(No Model.)

F. E. BENTON.
FASTENING FOR WHIP SOCKETS.

No. 396,323. Patented Jan. 15, 1889.

Witnesses.
A. Ruppert;
H. A. Daniels

Inventor.
F. E. Benton
Per
Thomas K. Shurtson
Atty

UNITED STATES PATENT OFFICE.

FRANCIS E. BENTON, OF STOUGHTON, MASSACHUSETTS.

FASTENING FOR WHIP-SOCKETS.

SPECIFICATION forming part of Letters Patent No. 396,323, dated January 15, 1889.

Application filed May 22, 1888. Serial No. 274,635. (No model.)

*To all whom it may concern:*

Be it known that I, FRANCIS E. BENTON, a citizen of the United States, residing at Stoughton, in the county of Norfolk and State of Massachusetts, have invented certain new and useful Improvements in Whip-Socket Fasteners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of my invention is to make a whip-socket band or fastener which will fit any dash-rail and have the screws out of sight.

Figure 1:
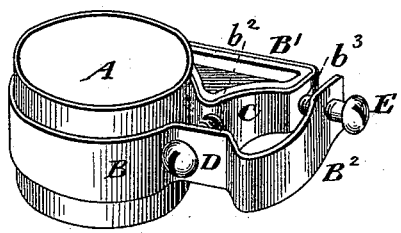
Figure 2:
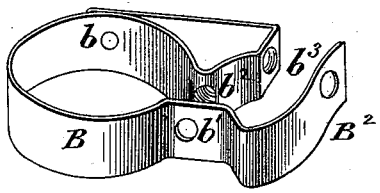
Figure 3:
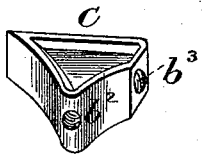

Figure 1 of the drawings is a plan view showing my invention applied to a whip-socket; Fig. 2, a detail perspective view of the band which fastens the socket to the rail of the dash, and Fig. 3 a detail view of the nut-block in which work the fastening and adjusting screws.

In the drawings, A represents the whip-socket, B the band or fastener, which is formed of a metallic strip of spring metal, and C the nut-block in which work the screws D E. The plate-spring B passes around the whip-socket A, one end, B', being carried around the nut-block and riveted at $b$ to the body of the spring, while holes are made at $b'$ $b^2$ $b^3$ for the screws D E.

The nut-block C is preferably concaved on one side to correspond to the curve of the whip-socket and enable it to fit snugly on the body of the spring.

The end $B^2$ of the spring strip or plate is made to pass around the dash-rail, so that the screw D may hold said strip tightly about the socket and the screw E hold it to the dash-rail, while both screws are so adjustable that the fastener may be used on any dash-rail.

Having thus described all that is necessary to a full understanding of my invention, what I claim as new, and desire to protect by Letters Patent, is—

A whip-socket fastener made of a strip of spring metal with one end turned back and riveted at $b$, the nut-block C, and the screws D E, holes for said screws being made at $b'$ $b^2$ $b^3$ in the metallic strip, as and for the purpose described.

In testimony whereof I affix my signature in presence of two witnesses.

FRANCIS E. BENTON.

Witnesses:
NICHOLA J. FURIE,
EUGENE H. MOORE.